United States Patent
Futamura et al.

(10) Patent No.: US 12,510,476 B2
(45) Date of Patent: Dec. 30, 2025

(54) PARTICLE ANALYSIS SYSTEM, INFORMATION PROCESSING METHOD, AND PROGRAM

(71) Applicant: Sony Group Corporation, Tokyo (JP)

(72) Inventors: Koji Futamura, Tokyo (JP); Naoki Morimoto, Tokyo (JP); Takamichi Yamakoshi, Tokyo (JP)

(73) Assignee: Sony Group Corporation, Tokyo (JP)

( * ) Notice: Subject to any disclaimer, the term of this patent is extended or adjusted under 35 U.S.C. 154(b) by 284 days.

(21) Appl. No.: 17/912,476

(22) PCT Filed: Mar. 16, 2021

(86) PCT No.: PCT/JP2021/010505
§ 371 (c)(1),
(2) Date: Sep. 16, 2022

(87) PCT Pub. No.: WO2021/193218
PCT Pub. Date: Sep. 30, 2021

(65) Prior Publication Data
US 2023/0168195 A1 Jun. 1, 2023

(30) Foreign Application Priority Data
Mar. 24, 2020 (JP) .................. 2020-052342

(51) Int. Cl.
*G01N 21/64* (2006.01)
*G01N 15/14* (2024.01)

(52) U.S. Cl.
CPC ............. *G01N 21/64* (2013.01); *G01N 15/14* (2013.01)

(58) Field of Classification Search
None
See application file for complete search history.

(56) References Cited

U.S. PATENT DOCUMENTS 6,510,007 B1 * 1/2003 Blasenheim ........... G02B 21/02
359/659
8,761,486 B2 * 6/2014 Heng .................. G01N 15/1434
382/133

(Continued)

FOREIGN PATENT DOCUMENTS

EP 0752133 B1 6/2000
JP H08507141 A 7/1996

(Continued)

OTHER PUBLICATIONS

International Search Report and English translation thereof mailed Jun. 1, 2021 in connection with International Application No. PCT/JP2021/010505.

(Continued)

*Primary Examiner* — David P Porta
*Assistant Examiner* — Djura Malevic
(74) *Attorney, Agent, or Firm* — Wolf, Greenfield & Sacks, P.C.

(57) ABSTRACT

A main objective of the present technology is to improve separation performance of a fluorescence spectrum.

The present technology provides a particle analysis system including: a light irradiation unit including at least one first light source that emits light with a wavelength equal to or greater than 350 nm and at least one second light source that emits light with a wavelength less than 350 nm; and a processing unit configured to perform unmixing processing on light data obtained by irradiating particles with light by the light irradiation unit. In addition, the present technology also provides an information processing method including an unmixing processing step of performing unmixing processing on light data obtained by irradiating particles with light by a light irradiation unit including at least one first light source that emits light with a wavelength equal to or (Continued)

greater than 350 nm and at least one second light source that emits light with a wavelength less than 350 nm.

19 Claims, 5 Drawing Sheets

(56) References Cited

U.S. PATENT DOCUMENTS

| | | | | |
|---|---|---|---|---|
| 9,568,423 B2* | 2/2017 | Li | | G01N 15/1459 |
| 9,746,412 B2* | 8/2017 | Chen | | G01N 15/1436 |
| 9,857,284 B1* | 1/2018 | Javadi | | G01N 15/1429 |
| 9,885,640 B2* | 2/2018 | Ketcham | | G01N 15/0255 |
| 9,983,113 B2* | 5/2018 | Matsuda | | G01B 9/02024 |
| 9,989,462 B2* | 6/2018 | Lumpkin | | G01N 15/1434 |
| 10,126,227 B2* | 11/2018 | Chen | | F04B 11/0025 |
| 10,209,174 B2* | 2/2019 | Chen | | G01N 15/1459 |
| 10,330,582 B2* | 6/2019 | Chen | | G02B 27/0025 |
| 10,545,081 B2* | 1/2020 | Baaske | | G01N 21/51 |
| 10,928,293 B2* | 2/2021 | Knollenberg | | G01N 1/02 |
| 10,997,845 B2* | 5/2021 | MacLaughlin | | G08B 21/182 |
| 11,181,455 B2* | 11/2021 | Bates | | G01N 15/1012 |
| 11,215,546 B2* | 1/2022 | MacLaughlin | | G01N 15/0606 |
| 11,255,772 B2* | 2/2022 | Chen | | G01N 15/1436 |
| 11,480,513 B2* | 10/2022 | Umetsu | | G01N 15/1434 |
| 11,630,064 B2* | 4/2023 | Sugiyama | | G01N 21/6456 |
| | | | | 356/73 |
| 11,703,443 B2* | 7/2023 | Chen | | G01N 15/1434 |
| | | | | 417/279 |
| 11,709,116 B2* | 7/2023 | Montange | | C12Q 1/70 |
| | | | | 435/5 |
| 11,781,963 B2* | 10/2023 | Ilkov | | G01N 15/1012 |
| | | | | 250/552 |
| 11,946,852 B2* | 4/2024 | Rodier | | G01N 15/1429 |
| 12,000,785 B2* | 6/2024 | James Shirley | | G01N 21/49 |
| 12,366,518 B2* | 7/2025 | Umetsu | | G01N 15/1459 |
| 2012/0091366 A1 | 4/2012 | Durack et al. | | |
| 2012/0123722 A1* | 5/2012 | Kakuta | | G01N 21/6428 |
| | | | | 702/189 |
| 2013/0050782 A1* | 2/2013 | Heng | | G01N 15/1434 |
| | | | | 358/494 |
| 2013/0200277 A1* | 8/2013 | Li | | G01N 15/1429 |
| | | | | 250/206 |
| 2013/0252237 A1* | 9/2013 | Wagner | | G01N 15/1434 |
| | | | | 435/6.1 |
| 2013/0346023 A1 | 12/2013 | Novo et al. | | |
| 2014/0247337 A1* | 9/2014 | Takamizawa | | G02B 21/0076 |
| | | | | 348/79 |
| 2016/0169809 A1* | 6/2016 | Jiang | | G01N 15/1434 |
| | | | | 250/214.1 |
| 2018/0266938 A1* | 9/2018 | Chow | | H10F 39/803 |
| 2018/0270435 A1* | 9/2018 | Chow | | H10F 39/191 |
| 2018/0284002 A1* | 10/2018 | Baaske | | G01N 21/51 |
| 2020/0072729 A1* | 3/2020 | Lumpkin | | G01N 15/1459 |
| 2020/0158603 A1* | 5/2020 | Scialo | | G01N 1/2202 |
| 2020/0158616 A1* | 5/2020 | Knollenberg | | G01N 15/0211 |
| 2020/0182772 A1* | 6/2020 | Umetsu | | G01N 15/1434 |
| 2020/0240896 A1* | 7/2020 | Karasikov | | G01N 15/1459 |
| 2020/0355599 A1* | 11/2020 | Rodier | | G01N 15/1459 |
| 2021/0041364 A1* | 2/2021 | Yi | | G01N 21/47 |
| 2021/0044978 A1* | 2/2021 | Michaelis | | H04W 12/63 |
| 2021/0063349 A1* | 3/2021 | Rodier | | G01N 27/622 |
| 2021/0102884 A1* | 4/2021 | MacLaughlin | | G01N 21/15 |
| 2021/0104146 A1* | 4/2021 | MacLaughlin | | G08B 27/008 |
| 2021/0136722 A1* | 5/2021 | Scialò | | G01N 1/02 |
| 2021/0208054 A1* | 7/2021 | Ellis | | G01N 15/1436 |
| 2021/0223273 A1* | 7/2021 | Scialò | | G01N 15/1433 |
| 2021/0381948 A1* | 12/2021 | Rodier | | G01N 15/0211 |
| 2021/0404936 A1* | 12/2021 | Bates | | G01N 15/1012 |
| 2022/0364971 A1* | 11/2022 | Kondo | | G01N 21/05 |
| 2025/0258088 A1* | 8/2025 | Chubachi | | G01N 21/31 |

FOREIGN PATENT DOCUMENTS

| | | |
|---|---|---|
| JP | 2011-232259 A | 11/2011 |
| JP | 2014-507662 A | 3/2014 |
| JP | 2014170105 A | 9/2014 |
| JP | 2019-501365 A | 1/2019 |
| WO | WO 2012/115979 A1 | 8/2012 |
| WO | WO 2015/120509 A1 | 8/2015 |
| WO | WO 2019/049442 A1 | 3/2019 |

OTHER PUBLICATIONS

Telford ed al., New 320nm Ultraviolet Laser Source Extending Flow Cytometry. Laser Focus World Japan, Nov. 2017., pp. 30-32. 10 pages.

International Written Opinion and English translation thereof mailed Jun. 1, 2021 in connection with International Application No. PCT/JP2021/010505.

International Preliminary Report on Patentability and English translation thereof mailed Oct. 6, 2022 in connection with International Application No. PCT/JP2021/010505.

Extended European Search Report issued Aug. 24, 2023 in connection with European Application No. 21775079.3.

\* cited by examiner

PARTICLE ANALYSIS SYSTEM, INFORMATION PROCESSING METHOD, AND PROGRAM

CROSS-REFERENCE TO RELATED APPLICATIONS

This application claims the benefit under 35 U.S.C. § 371 as a U.S. National Stage Entry of International Application No. PCT/JP2021/010505, filed in the Japanese Patent Office as a Receiving Office on Mar. 16, 2021, which claims priority to Japanese Patent Application Number 2020-052342, filed in the Japanese Patent Office on Mar. 24, 2020, each of which is hereby incorporated by reference in its entirety.

TECHNICAL FIELD

The present technology relates to a particle analysis system, an information processing method, and a program. More specifically, the present technology relates to a particle analysis system that analyzes particles on the basis of light generated by irradiating the particles with light, and an information processing method and a program used in the particle analysis system.

BACKGROUND ART

For example, the characteristics of particles are measured by labeling a particle population such as cells with a fluorescent dye and irradiating each particle of the particle population with laser light to measure intensity and/or a pattern of fluorescence generated from the excited fluorescent dye. As a representative example of a particle analysis device that performs this measurement, a flow cytometer can be exemplified.

The fluorescent dye is associated with an excitation wavelength with which a signal can be acquired with a high peak. Therefore, in the flow cytometer of the related art, the particles labeled with the fluorescent dye are irradiated with light that has an excitation wavelength, and the fluorescence signal is acquired using an optical filter corresponding to a peak wavelength region of the fluorescent dye.

On the other hand, in a spectral type flow cytometer, for example, fluorescence of each cell is collectively acquired as a spectrum. Fluorescence separation processing (also referred to as unmixing processing) is performed on the acquired fluorescence spectrum using a spectral reference of each fluorescent dye to acquire a fluorescence signal.

As a technology related to the fluorescence separation processing, for example, Patent Document 1 below discloses a fluorescence intensity correction method including a procedure in which the fluorescence generated from a fluorescent dye excited by irradiating microparticles multiply labeled with a plurality of fluorescent dyes of overlapping fluorescence wavelength bands with light is received by photodetectors that have different light reception wavelength bands arranged in a larger number than the number of fluorescent dyes, and a measurement spectrum obtained by collecting detected values from the photodetectors is approximated by a linear sum of single staining spectra obtained by microparticles individually labeled with the fluorescent dyes.

CITATION LIST

Patent Document

Patent Document 1: Japanese Patent Application Laid-Open No. 2011-232259

SUMMARY OF THE INVENTION

Problems to be Solved by the Invention

For example, in development of cancer immunotherapy, a flow cytometer capable of analyzing multicolored fluorescent dyes is often used for elucidating an immune mechanism. In the spectral type flow cytometer, by separating the fluorescence spectra acquired at once through the unmixing processing, as described above, it is possible to analyze particles labeled with more fluorescent dyes as compared with a flow cytometer of the related art. However, for example, in order to elucidate a complicated immune mechanism, further improved separation performance may be required.

Therefore, a main objective of the present technology is to improve the separation performance of a fluorescence spectrum.

Solutions to Problems

The present technology provides a particle analysis system including: a light irradiation unit including at least one first light source that emits light with a wavelength equal to or greater than 350 nm and at least one second light source that emits light with a wavelength less than 350 nm; and a processing unit configured to perform unmixing processing on light data obtained by irradiating particles with light by the light irradiation unit.

The at least one second light source may emit light with a wavelength equal to or greater than 250 nm and less than 350 nm.

The particle analysis system may be configured such that at least two pieces of excitation light among the excitation light emitted from the at least one first light source and the excitation light emitted from the at least one second light source are multiplexed, and the multiplexed excitation light is applied to the particles.

The particle analysis system may analyze a particle population labeled with a plurality of phosphors.

The processing unit may perform the unmixing processing using spectral reference data.

In the particle analysis system, spectrum data of fluorescence related to the particle population labeled with each of the plurality of phosphors may be used as spectral reference data used in the unmixing processing.

The particle analysis system may further include a detection unit configured to detect light generated by the light irradiation unit irradiating the particles with light.

The detection unit may include at least one photodetector that detects light generated by the light irradiation unit irradiating the particles with light.

The at least one photodetector may include a light reception element array.

The processing unit may acquire only a signal based on light received by some of the light reception elements included in the light reception element array in accordance with a wavelength of the light.

The at least one photodetector may be configured such that some of the light reception elements included in the light reception element array do not perform signal transmission in accordance with the wavelength of the light.

The at least one photodetector may be controlled such that some of the light reception elements included in the light reception element array do not perform signal transmission.

In a preferred embodiment of the present technology, the detection unit may include a plurality of photodetectors.

Each of the plurality of photodetectors may be associated with a light source included in the light irradiation unit.

The processing unit may acquire only a signal based on the light received by some of the light reception elements included in the light reception element array of each photodetector according to the wavelength of the light source associated with each photodetector.

In the preferred embodiment, each of the plurality of photodetectors may be configured not to transmit a signal of light with a wavelength equal to or less than a wavelength of an associated light source.

Only a light reception element that receives light with a wavelength longer than the wavelength of the associated light source among the light reception elements included in the light reception element array of each photodetector may be connected to a signal transmission circuit that transmits a signal based on the received light.

In the preferred embodiment, each of the plurality of photodetectors may be controlled so as not to transmit a signal of light with a wavelength equal to or less than a wavelength of an associated light source.

Each photodetector may be controlled such that only a light reception element that receives light with a wavelength longer than a wavelength of an associated light source among light reception elements included in the light reception element array transmits a signal based on the received light.

The plurality of photodetectors may include an identical light reception element array.

The at least one first light source may be a laser light source, and the at least one second light source may be a laser light source.

In addition, the present technology also provides an information processing method including an unmixing processing step of performing unmixing processing on light data obtained by irradiating particles with light by a light irradiation unit including at least one first light source that emits light with a wavelength equal to or greater than 350 nm and at least one second light source that emits light with a wavelength less than 350 nm.

In addition, the present technology also provides a program causing an information processing device to perform an unmixing processing step of performing unmixing processing on light data obtained by irradiating particles with light by a light irradiation unit including at least one first light source that emits light with a wavelength equal to or greater than 350 nm and at least one second light source that emits light with a wavelength less than 350 nm.

MODE FOR CARRYING OUT THE INVENTION

Hereinafter, preferred embodiments for carrying out the present technology will be described. Note that the embodiments to be described below illustrate representative embodiments of the present technology, and the scope of the present technology is not limited only to these embodiments. Note that the present technology will be described in the following order.

1. First Embodiment (particle analysis system)
  (1) Description of first embodiment
  (2) First example of first embodiment
  (2-1) Light irradiation unit
  (2-2) Chip
  (2-3) Detection unit
  (2-3-1) Example of detection unit
  (2-3-2) Example of detection unit
  (2-4) Exemplary configuration of optical system
  (2-5) Information processing device
  (2-6) Output unit and input unit
  (2-7) Example of information processing by information processing device
  (2-8) Particles
2. Second embodiment (particle analysis device)
3. Third embodiment (information processing method)
4. Fourth embodiment (program)
5. Examples 1. First Embodiment (Particle Analysis System)

(1) Description of First Embodiment

A particle analysis system according to the present technology includes a light irradiation unit including at least one first light source that emits light with a wavelength equal to or greater than 350 nm and at least one second light source that emits light with a wavelength less than 350 nm. As described above, by using the first light source that emits the light with a longer wavelength and the second light source that emits the light with a shorter wavelength in combination, it is possible to improve the fluorescence separation performance in the unmixing processing.

The present technology is suitable for, for example, a case where the number of types of phosphors to be used is large, such as multi-color analysis. For example, even in the case of 10 types or more, particularly 15 types or more, more particularly 20 types or more, further 25 types or more, 30 types or more, 35 types or more, or 40 types or more, more appropriate fluorescence separation processing can be performed by applying the present technology. The present technology may be applied for analysis of a population of particles labeled with the number of types of phosphors.

(2) First Example of First Embodiment

Figure 1:
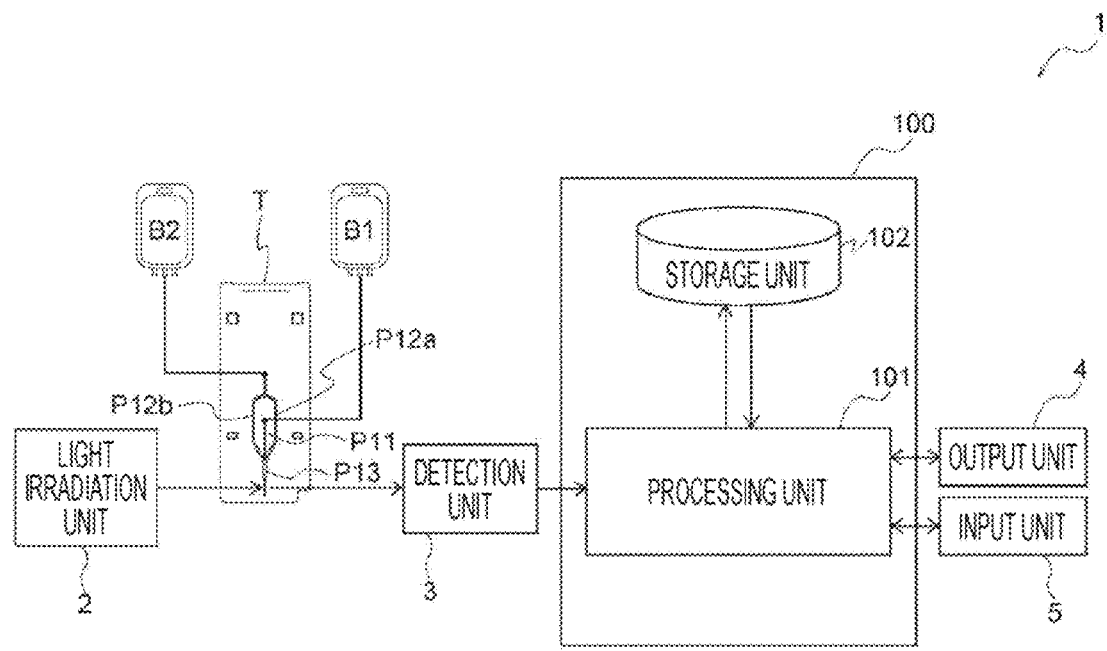
FIG. 1 is a diagram illustrating an exemplary configuration of a particle analysis system according to the present technology.

The particle analysis system according to the present technology may be configured as, for example, a particle analysis system that performs flow cytometry. An example of a particle analysis system according to the present technology configured as described above and an example of processing by the particle analysis system will be described below with reference to FIG. 1. FIG. 1 illustrates an exemplary configuration of a particle analysis system according to the present technology.

A particle analysis system 1 illustrated in FIG. 1 includes a light irradiation unit 2, a chip T provided with a flow path through which a particle to be analyzed flows, a detection unit 3, an information processing device 100, an output unit 4, and an input unit 5. The particle analysis system 1 is configured as a system that performs flow cytometry. For example, the light irradiation unit 2 and the detection unit 3 may be configured as one particle analysis device. The particle analysis device may be configured as a particle analysis system in combination with the information processing device 100. The particle analysis device may be connected to the information processing device 100 in a wired or wireless manner or via a network. The output unit 4 and the input unit 5 may be included in the particle analysis device or the information processing device 100 or may be configured as a device different from the particle analysis device and the information processing device 100.

(2-1) Light Irradiation Unit

The light irradiation unit 2 is configured to irradiate a predetermined position of the flow path of the chip T with light. When particles pass through the light irradiation position in the flow path, the particles are irradiated with the light. As a result, fluorescence is generated. That is, the light can act as excitation light on particles, particularly a phosphor that labels the particles.

The light irradiation unit 2 includes at least one first light source that emits light with a wavelength equal to or greater than 350 nm and at least one second light source that emits light with a wavelength less than 350 nm. By combining the first and second light sources, for example, it is possible to improve fluorescence separation performance in a case where the unmixing processing is performed, compared to a case where only the first light source is used.

The at least one first light source may be a laser light source, but may be another light source, for example, an LED or the like. The at least one second light source may also be a laser light source, but may also be another light source, for example, an LED or the like. Preferably, the at least one first light source is a laser light source, and the at least one second light source is a laser light source.

The at least one first light source is a light source that emits light with a wavelength preferably equal to or less than 900 nm, more preferably equal to or less than 880 nm, and still more preferably equal to or less than 850 nm. For example, the at least one first light source may be a light source that emits light with a wavelength equal to or greater than 350 nm and equal to or less than 900 nm, more preferably equal to or greater than 350 nm and equal to or less than 880 nm, and still more preferably equal to or greater than 350 nm and equal to or less than 850 nm.

The light may be, for example, laser light, that is, the at least one first light source may be a laser light source, which also applies to the following description of the first light source.

The number of at least one or more first light sources can be, for example, 1 to 20, particularly 2 to 15, and more particularly 3 to 10.

The at least one second light source is a light source that emits light with a wavelength preferably equal to or greater than 250 nm, more preferably equal to or greater than 260 nm, still more preferably equal to or greater than 270 nm, and particularly preferably equal to or greater than 280 nm. By setting the wavelength of light from the second light source to be equal to or greater than the foregoing lower limit, autofluorescence generated in light irradiation to particles (particularly cells) can be reduced, which contributes to an improvement in separation performance.

Preferably, the at least one second light source may be a light source that emits light with a wavelength equal to or greater than 250 nm and or less than 350 nm, preferably equal to or greater than 260 nm and less than 350 nm, more preferably equal to or greater than 270 nm and less than 350 nm, and still more preferably equal to or greater than 280 nm and less than 350 nm.

The light may be, for example, laser light, that is, the at least one second light source may be a laser light source, and this also applies to the following description of the second light source.

The number of the at least one second light sources can be, for example, 1 to 10, particularly 1 to 5, and more particularly 1 to 3.

According to one embodiment of the present technology, the at least one second light source may include at least one (for example, 1, 2 or 3) light source configured to emit light with a wavelength equal to or more than 305 nm and less than 350 nm, equal to or more than 310 nm and less than 350 nm, or equal to or more than 315 nm and less than 350 nm.

According to another embodiment of the present technology, the at least one second light source may include at least one (e.g. 1, 2 or 3) light source that emits light with a wavelength of less than 305 nm, less than 310 nm, or less than 315 nm.

According to still another embodiment of the present technology, the at least one second light source may include at least one (e.g. 1, 2 or 3) light source configured to emit light with a wavelength of less than 305 nm, less than 310 nm, or less than 315 nm, and at least one (e.g. 1, 2 or 3) light source configured to emit light with a wavelength of 305 nm or more and less than 350 nm, 310 nm or more and less than 350 nm, or 315 nm or more and less than 350 nm.

According to an embodiment of the present technology, a wavelength of the at least one second light source may be shorter than a minimum wavelength of wavelengths of the at least one first light source by, for example, 20 nm or more, 30 nm or more, or 40 nm or more.

The wavelength of the at least one second light source may preferably be different from any excitation maximum wavelength of the phosphor that labels the particle population to be analyzed by the particle analysis system of the present technology. The wavelength of the at least one second light source may be, for example, preferably 5 nm or more smaller, more preferably 10 nm or more smaller, and still more preferably 15 nm or more, 20 nm or more, or 25 nm or more smaller than the excitation maximum wavelength of the phosphor having the excitation maximum wavelength closest to the wavelength of the second light source (or the phosphor having the smallest excitation maximum wavelength) among the phosphors labeling the particle population to be analyzed. As described above, use of light obtained by irradiating the particles with light with a wavelength not associated with the excitation maximum wavelength of the phosphor in the unmixing processing contributes to improvement of fluorescence separation performance.

The total number of the first light source and the second light source may be two or more, for example, three or more, particularly four or more, and more particularly five or more. The total number may be, for example, 30 or less, particularly 20 or less, and more particularly 15 or less.

Each of the at least one first light source and the at least one second light source may be a laser light source that emits laser light with a single wavelength and may be, for example, a laser light source with a fixed oscillation wavelength or a laser light source with a variable oscillation wavelength. The wavelengths of these laser light sources are oscillation wavelengths. The laser light emitted from these laser light sources may be emitted to the particles with the oscillation wavelength.

In a case where the first light source is a laser light source, the first light source may be any one selected from a group consisting of a semiconductor laser, an argon ion (Ar) laser, a helium-neon (He—Ne) laser, a dye laser, a krypton (Cr) laser, and a solid-state laser in which a semiconductor laser and a wavelength conversion optical element are combined, and is particularly preferably a semiconductor laser. Alternatively, the first light source may be an LED.

The second light source may also be any laser light source selected from the group mentioned with regard to the first light source, and is particularly preferably a semiconductor laser. Alternatively, the second light source may be an LED.

The light irradiation unit 2 may be configured such that at least two pieces of excitation light among the excitation light (in particular, laser light) emitted from the at least one first light source and the excitation light (in particular, laser light) emitted from the at least one second light source are multiplexed, and the multiplexed excitation light is applied to the particles. That is, the light irradiation unit 2 may be configured such that one or more (for example, 1, 2, 3, 4, or 5) spots are irradiated with the plurality of pieces of multiplexed excitation light. The particle analysis system 1 may be configured such that the particles pass through the spot.

In order to configure the light irradiation unit 2 in this way, the light irradiation unit 2 may include a light guide optical system that guides the plurality of pieces of excitation light to a predetermined position. The light guide optical system may include, for example, optical components such as a beam splitter group, a mirror group, and the like in order to multiplex a plurality of pieces of excitation light. In addition, the light guide optical system may include a lens group collecting the multiplexed excitation light and may include, for example, an objective lens.

(2-2) Chip

The chip T may be configured as, for example, a flow cell. The chip T is provided with a flow path. The channel structure provided in the chip T is configured to form, for example, a flow (particularly, a laminar flow) in which particles flow substantially in a line.

The chip T illustrated in FIG. 1 is provided with flow paths P11, P12*a*, P12*b*, and P13. From a container (bag) B1 that stores a sample liquid containing particles, the sample liquid is introduced into a sample liquid flow path P11. The sample liquid flows through the sample liquid flow path P11 to the main flow path P13. The sheath liquid is introduced from the container (bag) B2 containing the sheath liquid to the chip T. The sheath liquid flows through two sheath liquid flow paths P12*a* and P12*b* to the main flow path P13. The sample liquid flow path P11 and the sheath liquid flow paths P12*a* and P12*b* are joined to form a main flow path P13. The sample liquid fed in the sample liquid flow path P11 and the sheath liquid fed in the sheath liquid flow paths P12*a* and P12*b* are joined at a point at which the three flow paths are joined, and then flow in the main flow path P13. In the main flow path P13, for example, a laminar flow in which the sample liquid is sandwiched between the sheath liquid flows. In the laminar flow, particles are arranged substantially in a line. The particles flowing side by side in the main flow path P13 are irradiated with light (in particular, laser light) generated by the light irradiation unit 2. Then, the light generated in this way is detected by the detection unit 3.

The chip T may have a 2-dimensional or 3-dimensional flow path structure. The chip T may have a substrate shape including a plastic material or a glass material. The channel structures formed in the chip T and the chip T are not limited to those illustrated in FIG. 1. For example, a chip and a channel structure known in the technical field related to a flow cytometer may be adopted. That is, in the present technology, fluorescence detection may be, for example, fluorescence detection by the flow cytometer.

The shape of the cross section of the flow path formed in the chip T may be, for example, circular, elliptical, rectangular (square or rectangular) or the like. In a case where the cross section of the flow path is circular or elliptical, the diameter or major axis may be, for example, equal to or less than 1 mm, and particularly equal to or greater than 10 µm and equal to or less than 1 mm. In a case where the cross section of the flow path is square or rectangular, the length of one side or long side may be, for example, equal to or less than 1 mm and in particular, equal to or greater than 10 µm and equal to or less than 1 mm.

The particles coming from the chip T may be fractionated. For example, for example by vibrating the chip with a vibration element such as a piezoelectric vibration element, a droplet containing one particle can be generated from the ejection port. By charging the droplets with the charging unit, a traveling direction can be controlled, and the particles can be fractionated. As described above, the particle analysis system 1 may be configured as a system that has a sorting function.

In addition, as the chip T, a chip provided with a fractionation mechanism in the chip may be used. As an example of such a chip, for example, a microchip for microparticle fractionation described in Japanese Patent Application Laid-Open No. 2019-174192 can be exemplified. With the chip, particles in the sample liquid can be fractionated without coming into contact with the outside air, that is, a closed type separation operation can be performed.

As described above, the particle analysis system 1 may include a fractionation unit that fractionates particles. The fractionation unit can fractionate the particles on the basis of the fluorescence detection result by the detection unit.

(2-3) Detection Unit

The detection unit 3 detects light generated by irradiating the particles with light by the light irradiation unit 2. For example, the detection unit 3 may be configured to detect light generated by irradiating the particles flowing in the flow path of the chip T with light. The light detected by the detection unit 3 is, for example, light including fluorescence, and may be light including fluorescence and light other than fluorescence. The detection unit 3 may be configured to further detect scattered light (for example, any one or more of forward scattered light, backward scattered light, and side scattered light) in addition to detecting fluorescence.

The detection unit 3 includes at least one photodetector that detects light generated by irradiating the particles with light by the light irradiation unit 2. The number of photodetectors included in the detection unit 3 may be, for example, 1 to 20, 1 to 15, or 1 to 10. Each photodetector includes one or more light reception elements, for example, a light reception element array. Each photodetector may include, for example, one or more photomultiplier tubes (PMTs) and/or photodiodes as a light reception element, and particularly includes one or more PMTs. The photodetector may include, for example, a PMT array in which a plurality of PMTs is arranged in a 1-dimensional direction. The at least one photodetector may detect fluorescence and may be configured as a fluorescence detector.

The number of light reception elements (for example, the number of PMTs) included in each photodetector may be, for example, 2 or more, 5 or more, 8 or more, 10 or more, 15 or more, 20 or more, 22 or more, 24 or more, or 26 or more. The number of light reception elements (for example, the number of PMTs) included in each photodetector may be, for example, 50 or less, 45 or less, or 40 or less.

The detection unit 3 may include a spectroscopic unit that disperses light. The spectroscopic unit may be included in each photodetector. The spectroscopic unit may be configured to, for example, disperse light (for example, fluorescence) and cause light with a predetermined detection wavelength to reach a light reception element (for example, a PMT) to which the predetermined detection wavelength is allocated.

Each photodetector included in the detection unit 3 includes a transmission unit that transmits a signal received by the light reception element. The transmission unit may include a signal transmission circuit connected to the light reception element. The signal transmission circuit may be configured as, for example, an amplifier circuit. The transmission unit amplifies the received signal, for example, and transmits the amplified signal to a signal processing unit to be described below.

In a case where the at least one photodetector included in the detection unit 3 includes a light reception element array, the processing unit 101 to be described below can acquire only a signal based on light received by some of the light reception elements of the light reception element array in accordance with a wavelength of the light. In order to enable the processing unit 101 to acquire such a signal, in a preferred embodiment of the present technology, the photodetector included in the detection unit 3 may be configured such that some of the light reception elements of the light reception element array do not perform signal transmission or may be controlled such that some of the light reception elements of the light reception element array do not perform signal transmission in accordance with the wavelength of the light (more specifically, in accordance with the wavelengths of the first and second light sources). As a result, a signal transmission amount can be reduced.

More specific exemplary configurations of the detection unit 3 and the photodetectors included in the detection unit 3 will be described in the following (2-3-1) and (2-3-2). The configuration of the photodetector capable of reducing the above-described signal transmission amount will be described in the following (2-3-2).

The detection unit 3 may include one or more measurement instruments selected from a fluorescence measurement instrument, a scattered light measurement instrument, a transmitted light measurement instrument, a reflected light measurement instrument, a diffracted light measurement instrument, an ultraviolet spectrometer, an infrared spectrometer, a Raman spectrometer, a FRET measurement instrument, and a FISH measurement instrument. In addition, the detection unit 3 may include, for example, a 2-dimensional light reception element such as a CCD or a CMOS.

The detection unit 3 can include a signal processing unit. The signal processing unit converts an electrical signal obtained by the fluorescence detector into a digital signal. The signal processing unit may include, for example, an A/D converter as a device that performs the conversion. The optical signal detected by the photodetector can be converted into a digital signal by the signal processing unit and can be then transmitted to the information processing device 100. The digital signal can be treated as light data by the information processing device 100 to be subjected to unmixing processing by a processing unit to be described below. The light data can include data related to fluorescence intensity.

The detection unit 3 (particularly, a photodetector) is disposed at a position at which light generated from the particles can be detected. For example, as illustrated in FIG. 1, the detection unit 3 may be disposed to sandwich the chip T (particularly, the main flow path P13) between the light irradiation unit 2 and the detection unit 3, or the detection unit 3 may be disposed on the same side as the light irradiation unit 2 with respect to the chip T.

(2-3-1) Example of Detection Unit

An example of the photodetector included in the detection unit 3 will be described below with reference to FIG. 3.

Figure 3:
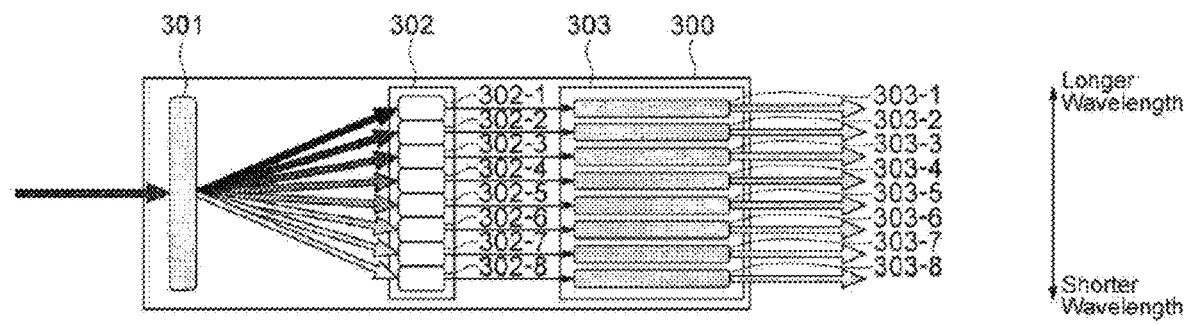
FIG. 3 is a diagram illustrating an example of a photodetector included in the particle analysis system according to the present technology.

The photodetector 300 illustrated in FIG. 3 includes a spectroscopic unit 301, a light reception element array 302, and a transmission unit 303.

The spectroscopic unit 301 spectrally disperses light generated by irradiating the particles with light by the light irradiation unit 2 and guides the dispersed light to the light reception element array 302. The spectroscopic unit 301 includes, for example, one prism or a plurality of prisms. In particular, the spectroscopic unit 301 includes a prism array including a plurality of prisms. A configuration of the spectroscopic unit 301 may be appropriately set in accordance with the configuration of the light reception element array 302. In FIG. 3, the spectroscopic unit 301 spectrally disperses the light into eight light beams with wavelengths from a longer wavelength $\lambda 1$ to a shorter wavelength $\lambda 8$. That is, $\lambda 1$ to $\lambda 8$ have a relationship of $\lambda 1 > \lambda 2 > \lambda 3 > \lambda 4 > \lambda 5 > \lambda 6 > \lambda 7 > \lambda 8$.

The light reception element array 302 receives the light dispersed by the spectroscopic unit 301. The light reception element array 302 may include a plurality of light reception elements 302-1 to 302-8 arranged as illustrated in FIG. 3. The light reception element 302-1 receives light with the wavelength $\lambda 1$. Similarly, the light reception elements 302-2 to 302-8 receive the light with the wavelengths $\lambda 2$ to $\lambda 8$, respectively.

Note that, in FIG. 3, the number of light reception elements included in one light reception element array 302 is eight, but the number of light reception elements is not limited thereto. The number of light reception elements included in the light reception element array 302 may be, for example, 2 or more, 5 or more, 8 or more, 10 or more, 15 or more, 20 or more, 22 or more, 24 or more, or 26 or more. The number of light reception elements included in the light reception element array 302 may be, for example, 50 or less, 45 or less, or 40 or less.

The light reception elements 302-1 to 302-8 included in the light reception element array 302 are optical sensors, and may be, for example, PMTs. That is, the light reception element array 302 may be a PMT array. The PMT can detect, for example, weak fluorescence generated by irradiating cells labeled with a fluorescent dye with light with high sensitivity. Each light reception element receives each piece of light dispersed by the spectroscopic unit 301 and converts the light into an electrical signal. Each light reception element transmits the converted electrical signal to the transmission circuit connected to each light reception element.

The transmission unit 303 transmits the electrical signal acquired by the light reception element array 302 to the outside of the photodetector 300, for example, to the information processing device 100 connected to the photodetector 300. The transmission unit 303 includes transmission circuits 303-1 to 303-8 connected to the light reception elements of the light reception element array 302. As illustrated in FIG. 3, one transmission circuit may be connected to one light reception element. Each transmission circuit may be configured as an amplifier circuit that amplifies the electrical signal obtained by the light reception element. An electrical signal based on the light is amplified by the amplifier circuit and is transmitted to, for example, a signal processing unit outside of the photodetector 300 or an information processing device.

(2-3-2) Example of Detection Unit

In a preferred embodiment of the present technology, the detection unit includes a plurality of photodetectors. In the embodiment, any one of the light sources included in the light irradiation unit may be associated with each of the plurality of photodetectors. More specifically, one of the at least one first light source and the at least one second light source may be associated with each of the plurality of photodetectors.

In the embodiment, the processing unit can acquire only the signal based on the light received by some of the light reception elements included in the light reception element array of each photodetector in accordance with the wavelength of the light source associated with each photodetector.

To enable, for example, each of the plurality of photodetectors to acquire a signal may be configured not to transmit a signal of light with a wavelength equal to or less than a wavelength of an associated light source or may be controlled not to transmit a signal of light with a wavelength equal to or less than a laser light wavelength of an associated light source. In the present specification, the "wavelength of the light source" is a wavelength of light emitted from the light source. In a case where the light source is a laser light source, the "wavelength of the light source" may be the wavelength of the laser light emitted by the laser light source.

In the embodiment, preferably, the plurality of photodetectors has the same light reception element array. As a result, the detection unit can be configured more easily.

By configuring the detection unit according to this embodiment, a signal amount to be transmitted can be reduced. The reduction in the signal amount to be transmitted will be described below in more detail.

In the particle analysis in which a plurality of fluorescent dyes such as the multi-color analysis described above is used, the signal amount acquired by fluorescence detection increases as the particles (particularly, cells) are labeled with a larger number of phosphors. The increase in the signal amount can result in, for example, an increase in a data transmission time, an increase in a burden on data processing, and an increase in a data occupancy ratio in a storage.

The fluorescence generated from the phosphor has a wavelength longer than a wavelength of excitation light. Therefore, the fluorescence detector assigned to detect fluorescence generated with predetermined excitation light is not required to detect light with a wavelength of the predetermined excitation light or a wavelength shorter than that of the predetermined excitation light. In the embodiment, the photodetector is configured not to transmit a signal of light with a wavelength equal to or less than the wavelength of the associated light source or is controlled not to transmit a signal of light with a wavelength equal to or less than the wavelength of the associated light source. As a result, light that is not required to be detected is not transmitted and the signal amount to be transmitted is reduced. Accordingly, this may result in a reduction in data transmission time, a reduction in a burden on data processing, and a reduction in data occupancy ratio in a storage.

For example, one light source may be associated with one photodetector or two or more photodetectors may be associated with one light source.

In the embodiment, an example in which each of the plurality of photodetectors is configured not to transmit a signal of fluorescence with a wavelength equal to or less than the wavelength of the associated light source will be described with reference to FIG. 4. In this example, in each photodetector, only a light reception element that receives light with a wavelength longer than the wavelength of the associated light source in the light reception element array is connected to a signal transmission circuit that transmits a signal based on the received light.

Figure 4:
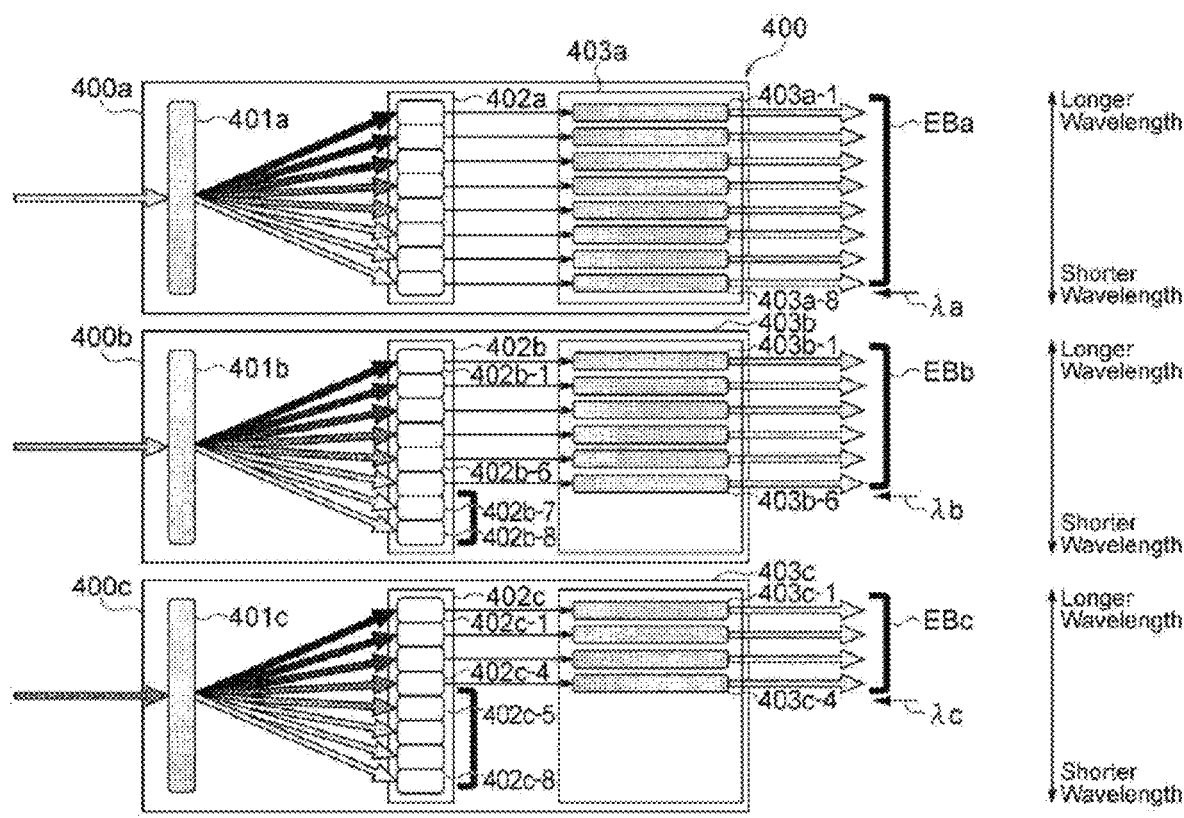
FIG. 4 is a diagram illustrating an example of a detection unit included in the particle analysis system according to the present technology.

The detection unit 3 illustrated in FIG. 4 includes three photodetectors 400a, 400b, and 400c.

The photodetector 400a includes a spectroscopic unit 401a, a light reception element array 402a, and a transmission unit 403a. The photodetector 400a, and the spectroscopic unit 401a, the light reception element array 402a, and the transmission unit 403a included therein are the same as the photodetector 300, and the spectroscopic unit 301, the light reception element array 302, and the transmission unit 303 described in the foregoing (2-3-1), and the description thereof also applies to the present example.

A predetermined light source a (not illustrated) included in the light irradiation unit 2 is associated with the photodetector 400a. The light source a emits light (in particular, laser light) with a wavelength λa. The wavelength λa is shorter than any of wavelengths λ1 to λ8 of light detected by the light reception element array 402a. The light with the wavelength λa emitted from the light source a is likely to generate fluorescence with wavelengths λ1 to λ8 longer than the wavelength λa. Therefore, a transmission circuit is connected to each of all the light reception elements.

The photodetector 400b includes a spectroscopic unit 401b, a light reception element array 402b, and a transmission unit 403b.

The photodetector 400b, and the spectroscopic unit 401b and the light reception element array 402b included in the photodetector 400b are the same as the photodetector 300, the spectroscopic unit 301, and the light reception element array 302 described in the foregoing (2-3-1), and the description thereof also applies to the present example.

On the other hand, the transmission unit 403b is different from the transmission unit 303 described in the foregoing (2-3-1), that is, is also different from the transmission unit 403a of the photodetector 400a. A difference is that the transmission circuit is connected only to some of the light reception elements included in the light reception element array 402*b*, and the transmission circuit is not connected to the remaining light reception elements. More specifically, while the transmission circuits 403*b*-1 to 403*b*-6 are respectively connected to the light reception elements 402*b*-1 to 402*b*-6, a transmission circuit is not connected to the light reception elements 402*b*-7 and 402*b*-8.

As described above, the transmission unit 403*b* is configured not to transmit a signal detected by some of the light reception elements of the light reception element array 402*b*.

A predetermined light source b (not illustrated) included in the light irradiation unit 2 is associated with the photodetector 400*b*. The light source b emits light (in particular, laser light) with a wavelength $\lambda b$. The wavelength $\lambda b$ is shorter than $\lambda 6$ and longer than $\lambda 7$ among the wavelengths $\lambda 1$ to $\lambda 8$ of the light which can be detected by the light reception element array 402*b*. Therefore, the laser light with the wavelength $\lambda b$ emitted by the light source b is likely to generate fluorescence with the wavelengths $\lambda 1$ to $\lambda 6$ longer than the wavelength $\lambda b$, but does not generate fluorescence with the wavelengths $\lambda 7$ and $\lambda 8$ shorter than the wavelength $\lambda b$. That is, the light reception elements 402*b*-7 and 402*b*-8 allocated to detect the wavelengths $\lambda 7$ and $\lambda 8$ are not required to transmit light. Therefore, a transmission circuit may not be connected to the light reception elements 402*b*-7 to 402*b*-8. Accordingly, signals are not transmitted from the light reception elements 402*b*-7 and 402*b*-8, and a signal transmission amount can be reduced as compared with a case where the transmission circuit is connected to the light reception elements 402*b*-7 and 402*b*-8.

The photodetector 400*c* includes a spectroscopic unit 401*c*, a light reception element array 402*c*, and a transmission unit 403*c*.

The photodetector 400*c*, and the spectroscopic unit 401*c* and the light reception element array 402*c* included in the photodetector 400*c* are the same as the photodetector 300, the spectroscopic unit 301, and the light reception element array 302 described in the foregoing (2-3-1), and the description thereof also applies to the present example.

On the other hand, the transmission unit 403*c* is different from the transmission unit 303 described in the foregoing (2-3-1), that is, is also different from the transmission unit 403*a* of the photodetector 400*a*. A difference is that the transmission circuit is connected only to some of the light reception elements included in the light reception element array 402*c*, and the transmission circuit is not connected to the remaining light reception elements. More specifically, while the transmission circuits 403*c*-1 to 403*c*-4 are respectively connected to the light reception elements 402*c*-1 to 402*c*-4, a transmission circuit is not connected to the light reception elements 402*c*-5 to 402*c*-8.

As described above, the transmission unit 403*c* is configured not to transmit a signal detected by some of the light reception elements of the light reception element array 402*c*.

A predetermined light source c (not illustrated) included in the light irradiation unit 2 is associated with the photodetector 400*c*. The light source c emits light (in particular, laser light) with a wavelength $\lambda c$. The wavelength $\lambda c$ is shorter than $\lambda 4$ and longer than $\lambda 5$ among the wavelengths $\lambda 1$ to $\lambda 8$ of the light which can be detected by the light reception element array 402*c*. Therefore, the light with the wavelength $\lambda c$ emitted by the light source c is likely to generate fluorescence with the wavelengths $\lambda 1$ to $\lambda 4$ longer than the wavelength $\lambda c$, but does not generate fluorescence with the wavelengths $\lambda 5$ to $\lambda 8$ shorter than the wavelength $\lambda c$. That is, the light reception elements 402*c*-5 to 402*c*-8 allocated to detect the wavelengths $\lambda 5$ to $\lambda 8$ are not required to transmit light. Therefore, a transmission circuit may not be connected to the light reception elements 402*c*-5 to 402*c*-8. Accordingly, signals are not transmitted from the light reception elements 402*c*-5 to 402*c*-8, and a signal transmission amount can be reduced as compared with a case where the transmission circuit is connected to the light reception elements 402*c*-5 to 402*c*-8.

An example of a case where each of the plurality of photodetectors is controlled not to transmit a signal of light with a wavelength equal to or less than the wavelength of the associated light source in this embodiment will be described with reference to FIG. 5. In this example, each photodetector is controlled such that only a light reception element that receives light with a wavelength longer than the wavelength of the associated light source in the light reception element array transmits a signal based on the received light.

Figure 5:
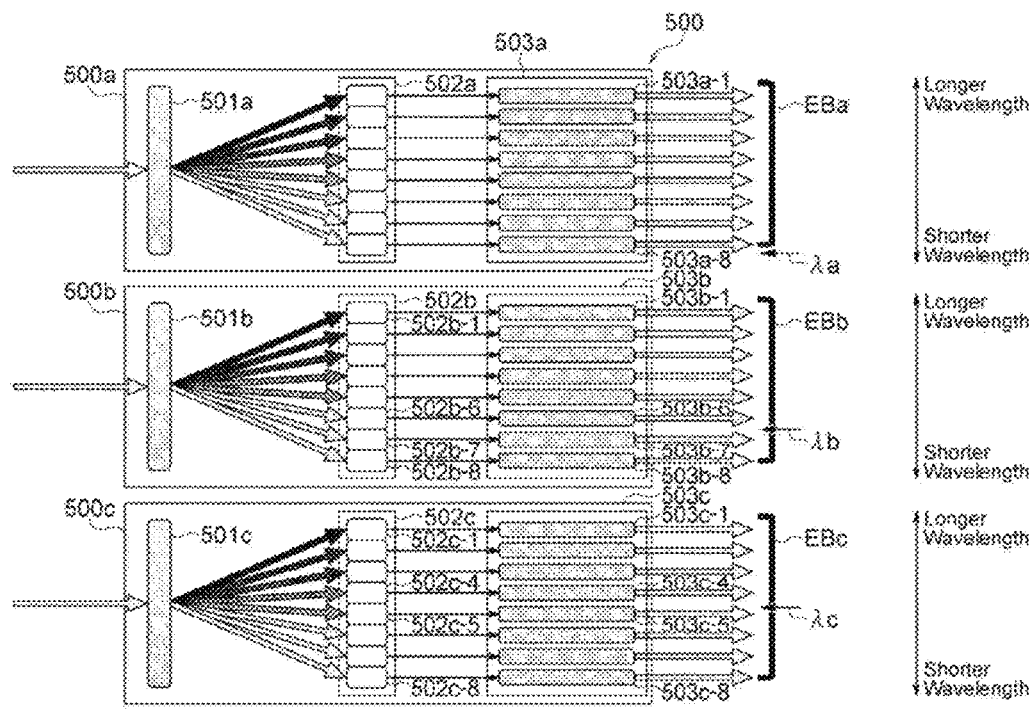
FIG. 5 is a diagram illustrating an example of a detection unit included in the particle analysis system according to the present technology.

The detection unit 3 illustrated in FIG. 5 includes three photodetectors 500*a*, 500*b*, and 500*c*.

The photodetector 500*a* includes a spectroscopic unit 501*a*, a light reception element array 502*a*, and a transmission unit 503*a*. The photodetector 500*a*, and the spectroscopic unit 501*a*, the light reception element array 502*a*, and the transmission unit 503*a* included in the photodetector 500*a* are the same as the photodetector 300, the spectroscopic unit 301, the light reception element array 302, and the transmission unit 303 described in the foregoing (2-3-1), and the description thereof also applies to the present example.

The photodetectors 500*b* and 500*c* are also the same as the photodetector 500*a*.

Each of the transmission units 503*a*, 503*b*, and 503*c* included in each of the photodetectors is configured to be able to control each of the transmission circuits included in the transmission units such that a signal is transmitted or a signal is not transmitted. For example, the information processing device 100 may control signal transmission of each transmission circuit.

For example, it is assumed that the predetermined light source a (not illustrated) included in the light irradiation unit 2 is associated with the photodetector 500*a*. The light source a emits light (in particular, laser light) with a wavelength $\lambda a$. The wavelength $\lambda a$ is shorter than any of the wavelengths of the fluorescence $\lambda 1$ to $\lambda 8$ detected by the light reception element array 502*a*. The light with the wavelength $\lambda a$ emitted from the light source a is likely to generate fluorescence with wavelengths $\lambda 1$ to $\lambda 8$ longer than the wavelength $\lambda a$. Therefore, the information processing device 100 can control all the transmission circuits included in the transmission unit 503*a* such that signal transmission is performed.

The predetermined light source b (not illustrated) included in the light irradiation unit 2 is associated with the photodetector 500*b*. The light source b emits light (in particular, laser light) with a wavelength $\lambda b$. The wavelength $\lambda b$ is shorter than $\lambda 6$ and longer than $\lambda 7$ among the wavelengths $\lambda 1$ to $\lambda 8$ of the light which can be detected by the light reception element array 502*b*. Therefore, the light with the wavelength $\lambda b$ emitted by the light source b is likely to generate fluorescence with the wavelengths $\lambda 1$ to $\lambda 6$ longer than the wavelength $\lambda b$, but does not generate fluorescence with the wavelengths $\lambda 7$ and $\lambda 8$ shorter than the wavelength $\lambda b$. That is, it is not necessary to transmit the light received by the light reception elements 502*b*-7 and 502*b*-8 allocated to detect the wavelengths $\lambda 7$ and $\lambda 8$, and the transmission circuit connected to the light reception elements 502*b*-7 to 502*b*-8 is not required to perform signal transmission either. Thus, for example, the information processing device 100 controls the transmission circuits 503b-1 to 503b-6 such that signals are transmitted and controls the transmission circuits 503b-7 and 503b-8 such that signals are not transmitted. Thus, a signal transmission amount can be reduced as compared with a case where the signal transmission to all the light reception elements 502b-1 to 502b-8 is performed.

The predetermined light source c (not illustrated) included in the light irradiation unit 2 is associated with the photodetector 500c. The light source c emits light (in particular, laser light) with a wavelength λc. The wavelength λc is shorter than λ4 and longer than λ5 among the wavelengths λ1 to λ8 of the light which can be detected by the light reception element array 502c. Therefore, the light with the wavelength λc emitted by the light source c is likely to generate fluorescence with the wavelengths λ1 to λ4 longer than the wavelength λc, but does not generate fluorescence with the wavelengths λ5 to λ8 shorter than the wavelength λc. That is, it is not necessary to transmit the light received by the light reception elements 502c-5 to 502c-8 allocated to detect the wavelengths λ5 to λ8, and the transmission circuit connected to the light reception elements 502c-5 to 502c-8 is not required to perform signal transmission either. Thus, for example, the information processing device 100 controls the transmission circuits 503c-1 to 503c-4 such that signals are transmitted and controls the transmission circuits 503c-5 to 503c-8 such that signals are not transmitted. Thus, a signal transmission amount can be reduced as compared with the case where the signal transmission to all the light reception elements 502c-1 to 502c-8 is performed.

(2-4) Exemplary Configuration of Optical System

Figure 2:
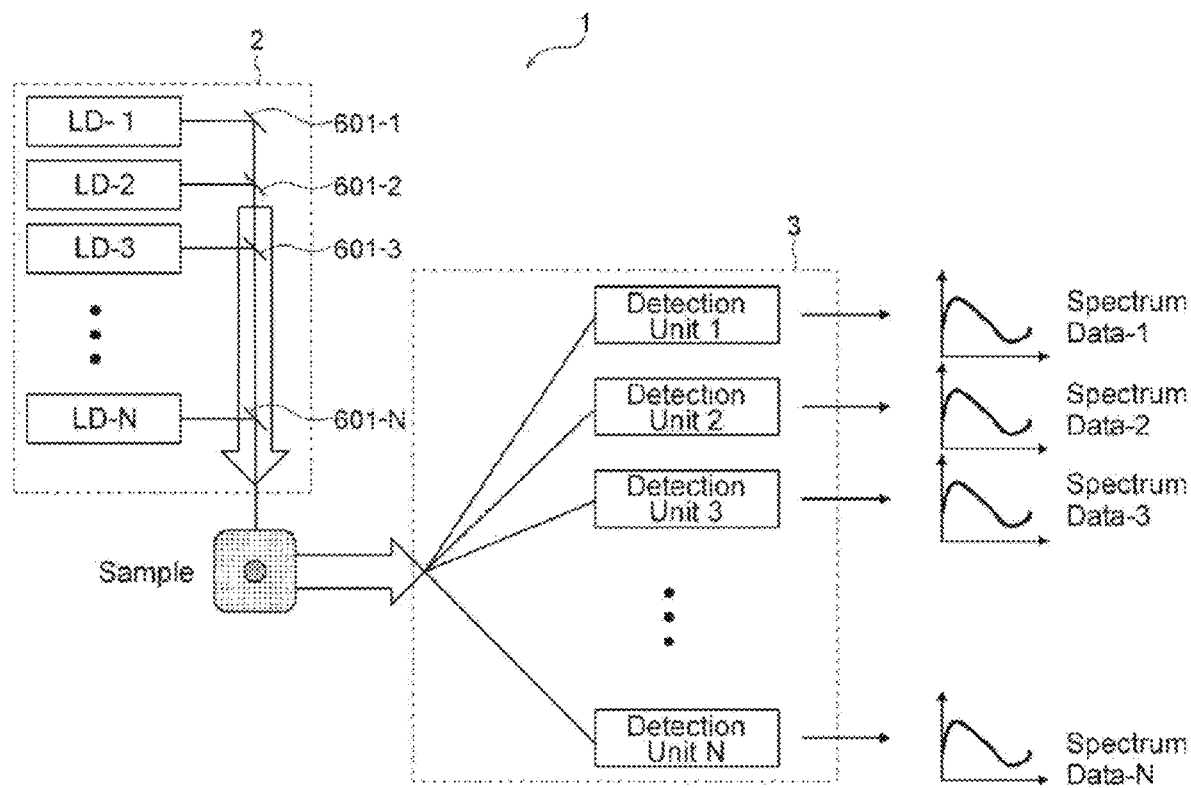
FIG. 2 is a schematic diagram illustrating an example of an optical system in the particle analysis system according to the present technology.

FIG. 2 illustrates a schematic exemplary configuration of an optical system in the particle analysis system 1 according to the present technology. As illustrated in FIG. 2, the particle analysis system 1 includes a light irradiation unit 2 and a detection unit 3.

The light irradiation unit 2 includes a plurality of laser light sources (LD-1, LD-2, LD-3, . . . , and LD-N and, here, N is any integer and may be the total number of the first and second light sources described above.). The plurality of laser light sources includes at least one first light source and at least one second light source described in the foregoing (2-1).

The light irradiation unit 2 includes optical components 601-1, 601-2, 601-3, . . . , 601 N included in the light guide optical system. These optical components may be, for example, mirrors or beam splitters, and can be appropriately selected according to the configuration of the light guide optical system. In addition, the light irradiation unit 2 may include, for example, a lens group (not illustrated) in order to condense and/or uniformize the laser light. The plurality of laser beams emitted from the plurality of laser light sources is multiplexed by the light guiding optical system. For example, a cell (indicated as a sample in FIG. 2) is irradiated with the multiplexed light.

The detection unit 3 includes photodetectors (Detection Unit 1, Detection Unit 1, Detection Unit 3, . . . , and Detection Unit N, and N is any integer and may be the total number of the first and second light sources described above.) associated with each laser light source. A laser light source that emits laser light to generate light (in particular, fluorescence) to be detected by each photodetector may be assigned to each photodetector in advance. The detection unit 3 detects light generated through light irradiation of the cell by the light irradiation unit 2.

On the basis of the light data obtained by the detection unit 3, the information processing device 100 generates spectrum data (Spectrum Data-1, Spectrum Data-2, Spectrum Data-3, . . . , Spectrum Data-N), as illustrated in the right of FIG. 2.

(2-5) Information Processing Device

As illustrated in FIG. 1, the information processing device 100 includes, for example, the processing unit 101 and a storage unit 102.

The processing unit 101 processes light data obtained by irradiating the particles with light by the light irradiation unit. The processing can include unmixing processing. The light data may be, for example, light data including fluorescence data. More specifically, the light data may be light intensity data, and the light intensity may be light intensity data of light including fluorescence.

The processing unit 101 preferably performs the unmixing processing using spectral reference data. Through the processing, the fluorescence intensity of each fluorescent dye can be acquired from the light data. Further, through this processing, leakage of fluorescence, which is a problem in a filter-type flow cytometer of the related art, is eliminated, and fluorescence separation performance is improved.

In the present specification, spectral reference data (also referred to as SR data) is spectrum data of fluorescence generated when each phosphor is irradiated with predetermined excitation light. The SR data is obtained, for example, by detecting fluorescence generated by irradiating particles labeled with each phosphor alone with predetermined excitation light by a fluorescence detector.

The spectral reference data used in the unmixing processing includes spectrum data of fluorescence generated when a phosphor that labels particles is irradiated with predetermined excitation light. In order to obtain spectral reference data used in the unmixing processing, for example, a particle population is first labeled with each of a plurality of phosphors that label a particle population to be analyzed to obtain a plurality of single-stained particle populations. Next, spectrum data of fluorescence generated through light irradiation (in particular, laser light irradiation) is obtained for each of the plurality of single-stained particle populations. The obtained spectrum data is used as spectral reference data. As described above, the spectrum data of fluorescence related to the particle population labeled with each of the plurality of phosphors can be used as spectral reference data in the unmixing processing. Accordingly, it possible to improve fluorescence separation performance.

Preferably, light with the same wavelength as the wavelength of the at least one first light source (particularly, laser light) and light with the same wavelength as the wavelength of the at least one second light source (particularly, laser light) can be used for the light irradiation for acquiring spectral reference data. For example, a light irradiation unit included in the particle analysis system according to the present technology may be used for the light irradiation performed to acquire spectral reference data.

The unmixing processing may be performed, for example, in accordance with a fluorescence intensity correction method or a fluorescence intensity calculation method described in Japanese Patent Application Laid-Open No. 2011-232259 (Patent Document 1).

An example of the information processing by the processing unit 101 will be described in the following (2-7).

The storage unit 102 stores various kinds of data. The storage unit 102 may be configured to be able to store, for example, the light data acquired by the detection unit 3. The storage unit 102 may be further configured to be able to store the spectral reference data.

The processing unit 101 can control the output unit 4 such that the processing result of the light data is output. In addition, the processing unit 101 can receive a signal from the input unit 5 (for example, an operation signal generated by a user operation of the input unit 5), and perform various types of processing and/or control of the information processing device 100 on the basis of the signal.

An exemplary configuration of the information processing device 100 will be described below. The processing by the processing unit 101 can be realized in accordance with, for example, the following configuration, but a configuration of the information processing device 100 is not limited to the following configuration.

The information processing device 100 may include, for example, a central processing unit (CPU), a RAM, and a ROM. The CPU, the RAM, and the ROM may be connected to each other via a bus. An input/output interface may be further connected to the bus. The output unit 4 and the input unit 5 can be connected to the bus via the input/output interface.

For example, a communication device, a storage device, and a drive may be further connected to the input/output interface.

The communication device connects the information processing device 100 to a network in a wired or wireless manner. By the communication device, the information processing device 100 can acquire various kinds of data (for example, light data and/or SR data or the like) via a network. The acquired data can be stored in, for example, the storage unit 102. The type of communication device may be appropriately selected by a person skilled in the art.

The storage device may store an operating system (for example, WINDOWS (registered trademark), UNIX (registered trademark), LINUX (registered trademark), or the like), a program and other various programs for causing an information processing device (or a particle analysis device or a particle analysis system) to perform an information processing method according to the present technology, and light data, SR data, and other various kinds of data.

The drive can read data (for example, light data, SR data, and the like) or a program recorded in a recording medium and output the data or the program to a RAM. The recording medium is, for example, a micro SD memory card, an SD memory card, or a flash memory, but is not limited thereto.

(2-6) Output Unit and Input Unit

The output unit 4 includes, for example, a device that outputs a result of processing of the light data by the processing unit 101. For example, the output unit 4 can output fluorescence data obtained by performing the unmixing processing or output data generated on the basis of the fluorescence data (for example, a 2-dimensional plot based on the fluorescence data, and the like). The output unit 4 may include, for example, a display device (display). The display device may output fluorescence data or output data obtained as a result of processing of the light data as an image (a still image or a moving image). In addition, the output unit 4 may include, for example, a printing device. The printing device may print and output fluorescence data or output data obtained as a result of processing of the light data on a print medium such as a paper sheet or the like.

The input unit 5 is, for example, a device that receives a user operation. The input unit 5 may include, for example, a mouse, a keyboard, or a display (in this case, the user operation may be a touch operation on the display). The input unit 5 transmits a user operation as an electrical signal to the information processing device 100. The processing unit 101 of the information processing device 100 can perform various types of processing in accordance with the electrical signal.

(2-7) Example of Information Processing by Information Processing Device

Figure 6:
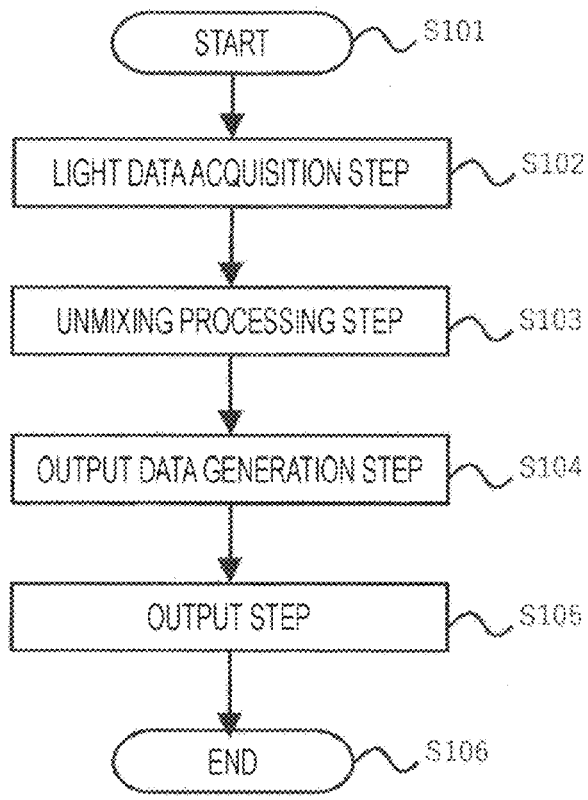
FIG. 6 is a diagram illustrating an example of a flowchart of an information processing method according to the present technology.

An example of information processing by the information processing device 100 will be described below with reference to FIG. 6. FIG. 6 illustrates an example of a flowchart of information processing by the information processing device 100.

In step S101, the information processing device 100 starts the information processing (in particular, processing of light data). For example, when a user clicks a predetermined processing start button displayed on the display of the output unit 4, the processing unit 101 displays a window for processing the light data on the display.

Note that before the processing of the light data starts, photodetection (in particular, flow cytometry) may be performed on a particle population labeled with a plurality of phosphors using the light irradiation unit 2, the chip T, and the detection unit 3 described above, and light data obtained as a result may be stored in the storage unit 102.

In step S102, the processing unit 101 acquires light data on the particle population. The processing unit 101 can receive, for example, the light data acquired by the detection unit 3. Alternatively, the processing unit 101 may acquire the light data stored in the storage unit 102.

In step S103, the processing unit 101 performs the unmixing processing on the light data acquired in step S102. The unmixing processing is also called fluorescence separation processing.

In step S103, the processing unit 101 preferably performs the unmixing processing using spectral reference data.

The spectral reference data used in the unmixing processing includes spectrum data of fluorescence generated when a phosphor that labels particles is irradiated with predetermined excitation light. The spectral reference data used in the unmixing processing preferably includes spectrum data of fluorescence generated in irradiation of the phosphor labeling the particles with light with the same wavelength as the light emitted from the at least one first light source and spectrum data of fluorescence generated in irradiation of the phosphor labeling the particles with light with the same wavelength as the light emitted from the at least one second light source.

The spectral reference data used in step S103 may be stored in the storage unit 102 in advance. The processing unit 101 can acquire the spectral reference data from, for example, the storage unit 102 and perform the unmixing processing.

The processing unit 101 can perform the unmixing processing using, for example, a least squares method (LSM), more preferably a weighted least squares method (WLSM). The unmixing processing in which the least squares method is used may be performed using, for example, a fluorescence intensity correction method described in Japanese Patent No. 5985140. The fluorescence intensity correction method can be performed using, for example, the following Expression (1) of the WLSM.

[Math. 1]

$$\begin{bmatrix} x_1 \\ \vdots \\ x_n \end{bmatrix} = ([S^T][L][S])^{-1} [S^T][L] \begin{bmatrix} y_1 \\ \vdots \\ y_m \end{bmatrix} \quad (1)$$

-continued $$L = \begin{bmatrix} \lambda_1 & 0 & 0 \\ 0 & \ddots & 0 \\ 0 & 0 & \lambda_m \end{bmatrix},$$

$$\lambda_i = \frac{1}{\max(y_i, 0) + \text{offset}},$$

In the above Expression (1), $x_n$ represents fluorescence intensity of the nth fluorescent dye, $[S^T]$ represents a transposed matrix of a spectral reference, [L] represents a weight matrix, [S] represents a matrix of the spectral reference, $y_i$ represents a measured value at an i-th photodetector, $\lambda_i$ represents the weight at the i-th photodetector, $\max(y_i, 0)$ represents a larger value by comparing a detected value of an i-th detector with zero, and offset' represents a value determined on the basis of the detected value of each detector.

A fluorescence wavelength distribution of the phosphor (for example, a fluorescent dye or the like) may be wide. Therefore, for example, the PMT used to detect fluorescence generated from a certain phosphor can also detect fluorescence generated from another phosphor. That is, the light data acquired by each PMT can be data in which fluorescence data from a plurality of phosphors is superimposed. Accordingly, it is necessary to perform correction for separating the light data into fluorescence data from each phosphor. The unmixing processing is a method for the correction, and the data in which the fluorescence data from the plurality of phosphors is superimposed is separated into the fluorescence data from each phosphor through the unmixing processing, and the fluorescence data from each phosphor is obtained.

In step S104, the processing unit 101 generates output data using the fluorescence data obtained through the unmixing processing. The output data may be, for example, a 2-dimensional plot of two desired phosphors among a plurality of phosphors used for labeling the particle population, but the present technology is not limited thereto. The vertical axis of the 2-dimensional plot may be fluorescence data (in particular, fluorescence intensity) of fluorescence corresponding to one phosphor between the two phosphors, and the horizontal axis may be fluorescence data (in particular, fluorescence intensity) of fluorescence corresponding to another phosphor. The 2-dimensional plot may be, for example, a density plot (dot plot), a contour plot, or a plot of both density and contour. The user may appropriately perform setting and developing operations of the gate for generating the 2-dimensional plot according to a purpose of the particle analysis.

In step S104, the processing unit 101 may generate one or more (for example, 2 or more, particularly 2 to 30, more particularly 2 to 20) generated 2-dimensional plots.

In addition, in step S104, the processing unit 101 may generate a plot based on scattered light (for example, any two of forward scattered light, side scattered light, and backscattered light) and/or a plot based on scattered light and fluorescence in addition to the 2-dimensional plot related to the two phosphors.

In step S105, the processing unit 101 can cause an output unit (for example, a display device of the output unit or the like) to output the output data (for example, the 2-dimensional plot or the like) generated in step S104.

In step S106, the processing unit 101 ends the information processing.

In addition, before the end, the processing unit 101 can store the fluorescence data after the unmixing processing and/or the generated output data in the storage unit 102.

(2-8) Particles

In the present technology, the particles may be, for example, particles that have dimensions in which the particles flow in a flow path formed in the chip T. In the present technology, the particles may be appropriately selected by those skilled in the art. In the present technology, the particles can include biological microparticles such as cells, cell masses, microorganisms, and liposomes or synthetic microparticles such as gel particles, beads, latex particles, polymer particles, industrial particles, and the like.

Biological microparticles (also referred to as biological particles) may include chromosomes, liposomes, mitochondria, organelles, and the like of various cells. The cells can include animal cells (such as blood cells) and plant cells. In particular, the cells can be blood-based cells or tissue-based cells. The blood cells may be, for example, suspension cells such as T cells and B cells. The tissue-based cells may be, for example, adherent cells or the like separated from adherent cultured cells or tissues. The cell mass can include, for example, spheroids, organoids, and the like. The microorganisms can include bacteria such as *Escherichia coli*, viruses such as tobacco mosaic virus, fungi such as yeast, and the like. Further, biological microparticles can also include biological macromolecules such as nucleic acids, proteins, and complexes thereof. These biological macromolecules may be, for example, macromolecules extracted from cells or macromolecules contained in blood samples or other liquid samples. According to one embodiment of the present technology, the particles are biological particles, particularly, cells.

The synthetic microparticles may be, for example, microparticles including an organic or inorganic polymer material, a metal, or the like. The organic polymer material can include polystyrene, styrene-divinylbenzene, polymethyl methacrylate, and the like. The inorganic polymer material can include glass, silica, a magnetic material, and the like. The metal can include gold colloid, aluminum, and the like. The synthetic microparticles may be, for example, gel particles, beads, or the like and, more particularly, may be gel particles or beads to which one or a combination of two or more selected from an oligonucleotide, a peptide, a protein, and an enzyme is bound.

The shape of the particles may be spherical or substantially spherical, or may be aspherical. The size and mass of the particles can be appropriately selected by those skilled in the art in accordance with the size of a flow path of a chip. On the other hand, the size of the flow path of the chip can also be appropriately selected in accordance with the size and mass of the particles.

The particle analysis system according to the present technology may analyze a particle population. In the particle analysis system according to the present technology, light irradiation by the light irradiation unit may be performed on the particles included in the particle population. The particle population may be particularly a biological particle population, and more particularly a cell population.

The particle analysis system according to the present technology may analyze a particle population labeled with a plurality of phosphors. The phosphor that labels the particle population may be a fluorescent dye to be described below. In addition, the fluorescent dye may be bound to the particles (particularly, cells) via molecules (for example, antibodies, aptamers, DNA or RNA, and the like, particularly, antibodies) that specifically are bound to the particles.

The particle population may be contained in a sample liquid when the light irradiation unit performs light irradiation. A type of sample liquid can be appropriately selected by those skilled in the art, and can be determined in accordance with a consideration factor such as a type of particles (cells) or the like. Note that a type of sheath liquid may also be appropriately selected by those skilled in the art.

The plurality of phosphors may be, for example, a plurality of dyes, particularly a plurality of fluorescent dyes. The phosphors may be, for example, phosphors (dyes) known in the technical field of flow cytometry. Examples of the fluorescent dyes can include, but are not limited to, Cascade Blue, Pacific Blue, Fluorescein isothiocyanate (FITC), AleaFluor 488, Phycoerythrin (PE), Propidium iodide (PI), Texas Red (TR), PE-efluor 610, PE/Dazzle 594, ECD (PE-TxRed), PE-CF 594, PE-Vio 615, 7-AAD, PE/Cy5, Peridinin chlorophyll protein (PerCP), PerCP/Cy 5.5, PerCP/eFluor 710, PE/Cy7, Allophycocyanin (APC), AlexaFluor 647, AlexaFluor 700, APC-AlexaFluor 700, APC/Fire 750, APC/eFluor 780, APC/H7, Brilliant Violet (BV421), BD Horizon V450, eFluor 450, Pacific Blue, 4', 6-Diamidino-2-phenylindole (DAPI), AmCyan, BD Horizon V500, Brilliant Violet 510, Pacific Orange, Brilliant Violet 570, Brilliant Violet 605, Brilliant Violet 650, eFluor 650 NC, Brilliant Violet 711, Brilliant Violet 785, Cy3, Cy5, and Cy7. In addition, the fluorescent dye may be a fluorescent dye described in Examples described later.

The particle population may be, for example, a particle population labeled with 5 or more phosphors, and more preferably a particle population labeled with 8 or more, 10 or more, 15 or more, or 20 or more phosphors. The particle population may be a particle population labeled with 22 or more types, 24 or more types, or 26 or more types of phosphors. The particle population may be, for example, a particle population labeled with 50 or less types, 45 or less types, or 40 or less types of phosphors. The particle analysis system according to the present technology is excellent in fluorescence separation performance, and is appropriate for analysis of a particle population labeled with such various types of phosphors (fluorescent dyes).

2. Second Embodiment (Particle Analysis Device)

The present technology also provides a particle analysis device including a detection unit that detects light generated by irradiating particles flowing in a flow path with light. The detection unit may include at least one photodetector that detects light generated by irradiating the particles with light by the light irradiation unit. Further, the at least one fluorescence detector may include a light reception element array, and the at least one photodetector may be configured such that some of light reception elements included in the light reception element array do not perform signal transmission or may be controlled such that some of light reception elements included in the light reception element array do not perform signal transmission in accordance with a wavelength of the light. Since the particle analysis device according to the present technology includes the detection unit, a signal transmission amount can be reduced.

The detection unit has been described above in the foregoing (2-3), and the description also applies to the present embodiment.

The particle analysis device according to the present technology may include the light irradiation unit described in the foregoing (2-1) in addition to the detection unit.

The particle analysis device according to the present technology may be configured as a particle analysis system in combination with the information processing device described in the above (2-5) and the output unit and the input unit described in the above (2-6). Alternatively, the particle analysis device according to the present technology may include any one or more of the information processing device, the output unit, and the input unit.

3. Third Embodiment (Information Processing Method)

The present technology also provides an information processing method including an unmixing processing step of performing the unmixing processing on light data obtained by irradiating particles with light by the light irradiation unit including at least one first light source that emits light with a wavelength equal to or greater than 350 nm and at least one second light source that emits light with a wavelength less than 350 nm.

The information processing method according to the present technology can be performed, for example, to process data obtained from a result of fluorescence detection for a particle population labeled with a plurality of phosphors. The information processing method according to the present technology may be performed by, for example, the particle analysis system described in the foregoing 1. or the particle analysis device described in the foregoing 2. and, in particular, may be executed by an information processing device that can be included in the particle analysis system or the particle analysis device.

The information processing method according to the present technology can include, for example, a light data acquisition step of acquiring light data on a particle population, an unmixing processing step of performing unmixing processing on the acquired light data, an output data generation step of generating output data using fluorescence data after the unmixing processing, and a data output step of outputting the generated output data.

The light data acquisition step corresponds to step S102 described in the foregoing (2-7) of 1. The unmixing processing step corresponds to step S103 described in the foregoing (2-7) of 1. The output data generation step corresponds to step S104 described in the foregoing (2-7) of 1. The data output step corresponds to step S105 described in the foregoing (2-7) of 1. Therefore, the description of these steps in the foregoing (2-7) of 1. also applies to each step in the information processing method according to the present technology.

4. Fourth Embodiment (Program)

The present technology also provides a program causing an information processing device to execute the information processing method described in the foregoing 3. The information processing method is as described in the foregoing 1. and 3., and the description also applies to the present embodiment. The program according to the present technology may be recorded in, for example, the above-described recording medium or may be stored in the above-described information processing device or a storage device included in the above-described information processing device.

5. Examples

Particle analysis processing was performed using a flow cytometer including a light irradiation unit including a laser light source that emits laser light with a wavelength of 320 nm and six laser light sources that emit laser light with a wavelength equal to or greater than 350 nm.

As an analysis target of the particle analysis processing, a cell population obtained by hemolysis of healthy human blood was used as a sample.

In addition, 43 antibodies to which the following 43 fluorescent dyes were bound were prepared. All antibodies provided were anti-CD4 antibodies.

Alexa Fluor 488, Alexa Fluor 514, Alexa Fluor 647, Alexa Fluor 700, APC-Cy7, APC, BUV395, BUV496, BUV563, BUV661, BUV737, BUV805, BV421, BV480, BV510, BV 570, BV 605, BV 650, BV 711, BV 750, BV 786, Cy3, PacificBlue, PacificOrange, PE-AF 610, PE-AF 700, PE-Cy5, PE-Cy 5.5, PE-Cy7, PE-Dazzle 594, PE, PerCP-Cy 5.5, PerCP-eF 710, PerCP, Qdot 525, Qdot 545, Qdot 565, Qdot 585, Qdot 605, Qdot 625, Qdot 655, Qdot 705, and SB 702.

The sample was labeled with each of the 43 fluorochrome-bound antibodies. Accordingly, the 43 samples labeled with each antibody were obtained. The resulting 43 samples were each put in a tube. In addition, an unlabeled sample not labeled with any antibody was also prepared in the tube. Accordingly, a total of 44 samples put in the tubes were obtained.

For each of the 44 samples, 44 pieces of fluorescence spectrum data were acquired using the flow cytometer. The 44 pieces of fluorescence spectrum data were used as spectral reference data below.

In addition, the 44 pieces of fluorescence spectrum data were merged to obtain merged data. The merged data was subjected to an unmixing processing using the 44 pieces of spectral reference data. A 2-dimensional plot was generated using the data obtained through the unmixing processing. The generated 2-dimensional plot is shown in FIG. 7.

The 44 pieces of fluorescence spectrum data were acquired using the flow cytometer for each of the 44 samples in accordance with the same method as the foregoing method except that the laser light source that emits the laser light with the wavelength of 320 nm was not turned on. The 44 pieces of fluorescence spectrum data were used as spectral reference data below.

In addition, the 44 pieces of fluorescence spectrum data were merged in accordance with the same method as the foregoing method to obtain merged data. The merged data was subjected to the unmixing processing in accordance with the same method as the foregoing method using the 44 spectral reference data, and a 2-dimensional plot was generated. The generated 2-dimensional plot is shown in FIG. 8.

Figure 7:
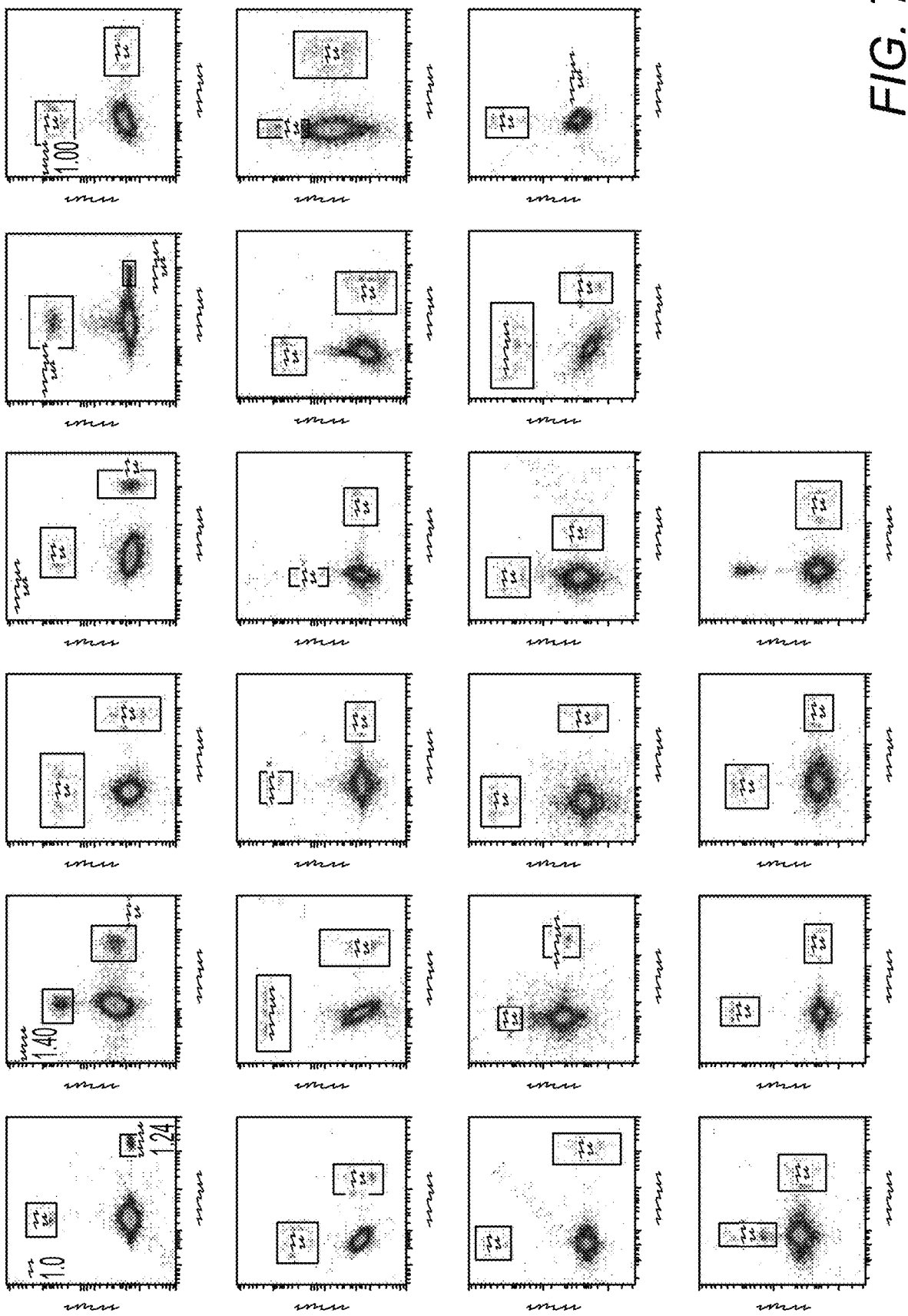
FIG. 7 is a diagram illustrating a 2-dimensional plot based on light data obtained by turning on laser light of 320 nm.
Figure 8:
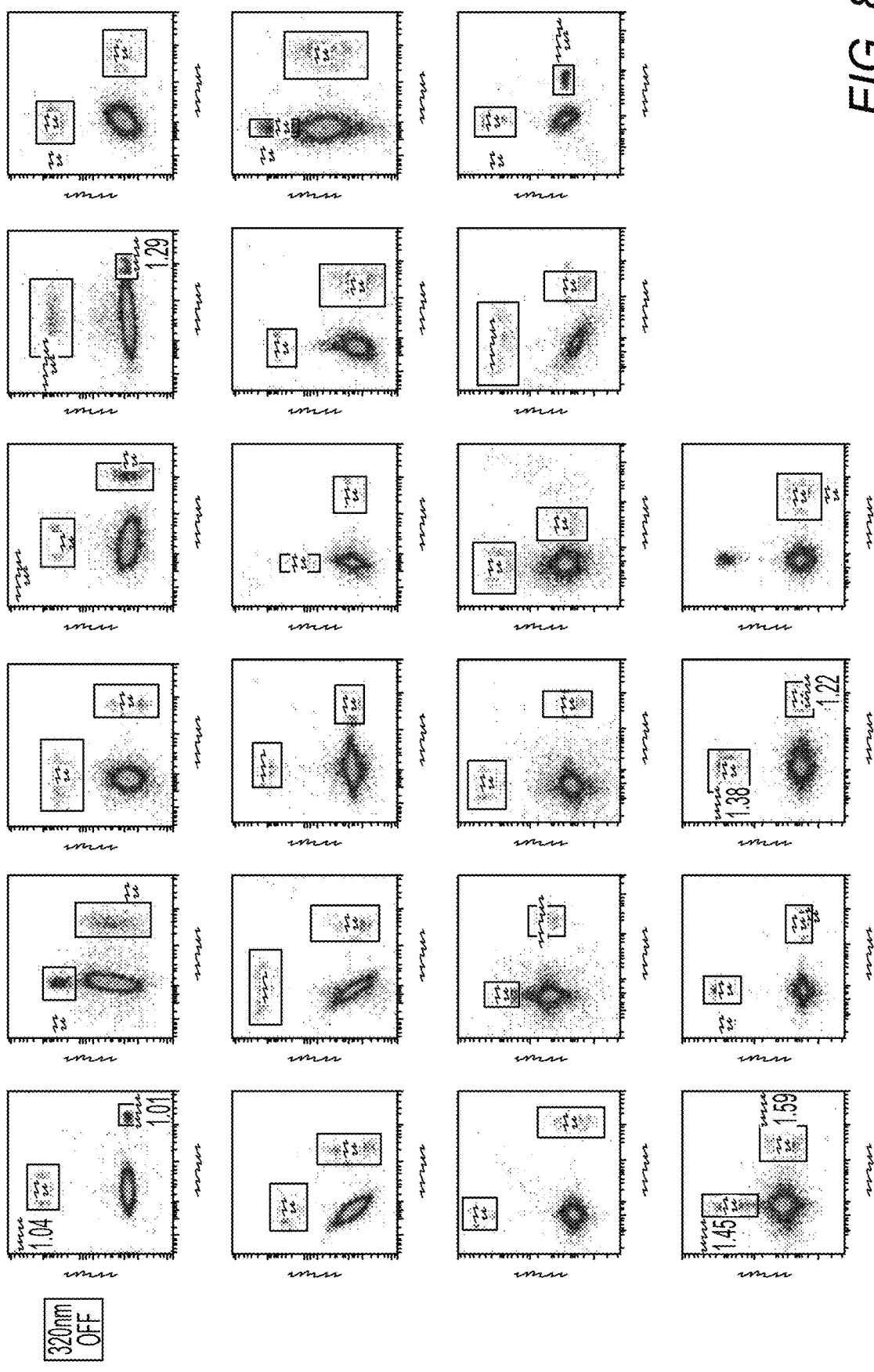
FIG. 8 is a diagram illustrating a 2-dimensional plot based on light data obtained without turning on laser light of 320 nm.

From the comparison of the 2-dimensional plots of FIGS. 7 and 8, it can be understood that the fluorescence separation performance is improved by using the laser light with the wavelength of 320 nm. In addition, the S/N ratio in the case where the laser light with the wavelength of 320 nm was used was improved by about 30% as compared with the case where the laser light with the wavelength of 320 nm was not turned on.

From the above results, it can be understood that, in the particle fluorescence analysis, the fluorescence separation performance is improved by using a laser light source that emits laser light with a wavelength less than 350 nm in combination with six laser light sources that emit laser light with wavelengths equal to or greater than 350 nm and performing the unmixing processing.

Note that the present technology can also have the following configurations.

[1]

A particle analysis system including:
a light irradiation unit including at least one first light source that emits light with a wavelength equal to or greater than 350 nm and at least one second light source that emits light with a wavelength less than 350 nm; and
a processing unit configured to perform unmixing processing on light data obtained by irradiating particles with light by the light irradiation unit.

[2]

The particle analysis system according to [1], in which the at least one second light source emits light with a wavelength equal to or greater than 250 nm and less than 350 nm.

[3]

The particle analysis system according to [1] or [2], in which at least two pieces of excitation light among the excitation light emitted from the at least one first light source and the excitation light emitted from the at least one second light source are multiplexed, and the multiplexed excitation light is applied to the particles.

[4]

The particle analysis system according to any one of [1] to [3], in which the particle analysis system analyzes a particle population labeled with a plurality of phosphors.

[5]

The particle analysis system according to any one of [1] to [4], in which the processing unit performs the unmixing processing using spectral reference data.

[6]

The particle analysis system according to [4], in which spectrum data of fluorescence related to the particle population labeled with each of the plurality of phosphors is used as spectral reference data used in the unmixing processing.

[7]

The particle analysis system according to any one of [1] to [6], further including a detection unit configured to detect light generated by the light irradiation unit irradiating the particles with light.

[8]

The particle analysis system according to [7], in which the detection unit includes at least one photodetector that detects light generated by the light irradiation unit irradiating the particles with light, and
the at least one photodetector includes a light reception element array, and
the processing unit acquires only a signal based on light received by some of the light reception elements included in the light reception element array in accordance with a wavelength of the light.

[9]

The particle analysis system according to [8], in which the at least one photodetector is configured such that some of the light reception elements included in the light reception element array do not perform signal transmission in accordance with the wavelength of the light.

[10]

The particle analysis system according to [8], in which the at least one photodetector is controlled such that some of the light reception elements included in the light reception element array do not perform signal transmission in accordance with the wavelength of the light.

[11]

The particle analysis system according to [7], in which the detection unit includes a plurality of photodetectors,
each of the plurality of photodetectors is associated with a light source included in the light irradiation unit, and
the processing unit acquires only a signal based on the light received by some of the light reception elements included in the light reception element array of each photodetector according to the wavelength of the light source associated with each photodetector.

[12]

The particle analysis system according to [11], in which each of the plurality of photodetectors is configured not to transmit a signal of light with a wavelength equal to or less than a wavelength of an associated light source, and only a light reception element that receives light with a wavelength longer than the wavelength of the associated light source among the light reception elements included in the light reception element array of each photodetector is connected to a signal transmission circuit that transmits a signal based on the received light.

[13]

The particle analysis system according to [11], in which each of the plurality of photodetectors is controlled so as not to transmit a signal of light with a wavelength equal to or less than a wavelength of an associated light source, and each photodetector is controlled such that only a light reception element that receives light with a wavelength longer than a wavelength of an associated light source among light reception elements included in the light reception element array transmits a signal based on the received light.

[14]

The particle analysis system according to any one of to [13], in which the plurality of photodetectors includes an identical light reception element array.

[15]

The particle analysis system according to any one of [1] to [14], in which the at least one first light source is a laser light source, and the at least one second light source is a laser light source.

[16]

An information processing method including:

an unmixing processing step of performing unmixing processing on light data obtained by irradiating particles with light by a light irradiation unit including at least one first light source that emits light with a wavelength equal to or greater than 350 nm and at least one second light source that emits light with a wavelength less than 350 nm.

[17]

A program causing an information processing device to perform an unmixing processing step of performing unmixing processing on light data obtained by irradiating particles with light by a light irradiation unit including at least one first light source that emits light with a wavelength equal to or greater than 350 nm and at least one second light source that emits light with a wavelength less than 350 nm.

REFERENCE SIGNS LIST

1 Particle analysis system
2 Light irradiation unit
T Chip
3 Detection unit
100 Information processing device
101 Processing unit
102 Storage unit
4 Output unit
5 Input unit

The invention claimed is:

1. A particle analysis system comprising:
a light irradiator including at least one first light source that emits light with a wavelength equal to or greater than 350 nm and at least one second light source that emits light with a wavelength less than 350 nm;
light data storage configured to store:
light data acquired by the at least one light detector and spectral reference data; and
a light data processor configured to perform unmixing processing on light data obtained by irradiating particles with light by the light irradiator
wherein
the spectral reference data used in the unmixing process may be stored in the light data storage in advance, and
the light data processor acquires the spectral reference data from the light data storage and performs the unmixing process; and
at least one light detector configured to detect the light data generated by the light irradiator irradiating the particles with the light, wherein the at least one light detector comprises:
a first plurality of light reception elements configured to generate the light data based on the first light source, the first plurality of light reception elements being associated with the first plurality of wavelengths, respectively, and
a second plurality of light reception elements configured to generate the light data based on the second light source, the second plurality of light reception elements being associated with the second plurality of wavelengths, respectively, wherein the first plurality of wavelengths is a subset of the second plurality of wavelengths.

2. The particle analysis system according to claim 1, wherein the at least one second light source emits light with a wavelength equal to or greater than 250 nm and less than 350 nm.

3. The particle analysis system according to claim 1, wherein at least two pieces of excitation light among the excitation light emitted from the at least one first light source and the excitation light emitted from the at least one second light source are multiplexed, and the multiplexed excitation light is applied to the particles.

4. The particle analysis system according to claim 1, wherein the particle analysis system analyzes a particle population labeled with a plurality of phosphors.

5. The particle analysis system according to claim 4, wherein spectrum data of fluorescence related to the particle population labeled with each of the plurality of phosphors is used as spectral reference data used in the unmixing processing.

6. The particle analysis system according to claim 1, wherein the light data processor performs the unmixing processing using spectral reference data.

7. The particle analysis system according to claim 1, wherein
the light detector includes at least one photodetector that detects light generated by the light irradiator irradiating the particles with light to output the light data, and
the at least one photodetector includes a light reception element array comprising the second plurality of light reception elements, the first plurality of light reception elements being a subset of the second plurality of light reception elements, and
the light data processor acquires only a signal based on light received by some of the light reception elements included in the light reception element array in accordance with a wavelength of the light.

8. The particle analysis system according to claim 7, wherein the at least one photodetector is configured such that some of the second plurality of light reception elements included in the light reception element array do not perform signal transmission in accordance with the wavelength of the light being 350 nm.

9. The particle analysis system according to claim 7, wherein the at least one photodetector is controlled such that some of the second plurality of light reception elements included in the light reception element array do not perform signal transmission in accordance with the wavelength of the light being 350 nm.

10. The particle analysis system according to claim 1, wherein
the light detector includes a plurality of photodetectors, each of the plurality of photodetectors being associated with a light source included in the light irradiator, and
the light data processor acquires a signal based on light received by only some of the light reception elements of at least one of the plurality of photodetectors.

11. The particle analysis system according to claim 10, wherein
each of the plurality of photodetectors is configured not to transmit a signal of light with a wavelength equal to or less than a wavelength of the associated light source, and
only a light reception element that receives light with a wavelength longer than the wavelength of the associated light source of each of the plurality of photodetectors is connected to a signal transmission circuit that transmits a signal based on the received light.

12. The particle analysis system according to claim 10, wherein
each of the plurality of photodetectors is controlled so as not to transmit a signal of light with a wavelength equal to or less than a wavelength of an associated light source, and
each photodetector is controlled such that only a light reception element that receives light with a wavelength longer than a wavelength of the associated light source transmits a signal based on the received light.

13. The particle analysis system according to claim 10, wherein the plurality of photodetectors includes an identical light reception element array of light reception elements.

14. The particle analysis system according to claim 1, wherein the at least one first light source is a laser light source, and the at least one second light source is a laser light source.

15. The particle analysis system according to claim 1, wherein the light data processor performs the unmixing processing using the Least Squares Method (LSM).

16. An information processing method comprising:
an unmixing processing step of performing unmixing processing on light data obtained by irradiating particles with light by a light irradiator including at least one first light source that emits light with a wavelength equal to or greater than 350 nm and at least one second light source that emits light with a wavelength less than 350 nm, and
a light data storage step of storing:
light data acquired by the at least one light detector and spectral reference data; and
a light data processing step of performing unmixing processing on light data obtained by irradiating particles with light by the light irradiator
wherein
the spectral reference data used in the unmixing process may be stored in the light data storage in advance, and
the light data processor acquires the spectral reference data from the light data storage and performs the unmixing process; and
a light detection step of obtaining light data detected by at least one light detector configured to detect the light data generated by the light irradiator irradiating the particles with the light, wherein the at least one light detector comprises:
a first plurality of light reception elements configured to generate the light data based on the first light source, the first plurality of light reception elements being associated with the first plurality of wavelengths, respectively, and
a second plurality of light reception elements configured to generate the light data based on the second light source, the second plurality of light reception elements being associated with the second plurality of wavelengths, respectively, wherein the first plurality of wavelength is a subset of the second plurality of wavelengths.

17. The particle analysis system according to claim 16, wherein the light data processor performs the unmixing processing using the Least Squares Method (LSM).

18. A non-transitory computer-readable medium storing a program that, when processed by a processor of an information processing device, causes the information processing device to perform:
an unmixing processing step of performing unmixing processing on light data obtained by irradiating particles with light by a light irradiator including at least one first light source that emits light with a wavelength equal to or greater than 350 nm and at least one second light source that emits light with a wavelength less than 350 nm, and
a light data storage step of storing:
light data acquired by the at least one light detector and spectral reference data; and
a light data processing step of performing unmixing processing on light data obtained by irradiating particles with light by the light irradiator
wherein
the spectral reference data used in the unmixing process may be stored in the light data storage in advance, and
the light data processor acquires the spectral reference data from the light data storage and performs the unmixing process; and
a light detection step of obtaining light data detected by at least one light detector configured to detect the light data generated by the light irradiator irradiating the particles with the light, wherein the at least one light detector comprises:
a first plurality of light reception elements configured to generate the light data based on the first light source, the first plurality of light reception elements being associated with the first plurality of wavelengths, respectively, and
a second plurality of light reception elements configured to generate the light data based on the second light source, the second plurality of light reception elements being associated with the second plurality of wavelengths, respectively, wherein the first plurality of wavelength is a subset of the second plurality of wavelengths.

19. The particle analysis system according to claim 18, wherein the light data processor performs the unmixing processing using the Least Squares Method (LSM).

* * * * *